(12) United States Patent
Horii

(10) Patent No.: US 7,957,123 B2
(45) Date of Patent: Jun. 7, 2011

(54) PORTABLE ELECTRONIC DEVICE

(75) Inventor: Seiji Horii, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 107 days.

(21) Appl. No.: 12/525,064

(22) PCT Filed: Jan. 30, 2008

(86) PCT No.: PCT/JP2008/051455
§ 371 (c)(1),
(2), (4) Date: Aug. 18, 2009

(87) PCT Pub. No.: WO2008/093754
PCT Pub. Date: Aug. 7, 2008

(65) Prior Publication Data
US 2010/0091439 A1    Apr. 15, 2010

(30) Foreign Application Priority Data

Jan. 30, 2007 (JP) ................................. 2007-019291
Jan. 30, 2007 (JP) ................................. 2007-019292

(51) Int. Cl.
*G06F 1/16*    (2006.01)
(52) U.S. Cl. .................. 361/679.01; 455/41.2; 206/320; 360/97.01; 429/421
(58) Field of Classification Search ............... 455/575.4, 455/575.3, 410, 556.1, 566, 41.2; 29/592.1, 29/846, 25.35, 594, 603.03; 174/260; 361/679.01, 361/679.21, 679.31, 679.32, 679.34, 679.26, 361/679.57, 679.27, 679.33, 679.55, 679.09; 429/416, 421; 206/320, 701, 305; 360/99.02, 99.04, 97.01, 99.01, 256
See application file for complete search history.

(56) References Cited

U.S. PATENT DOCUMENTS

| 2008/0207283 A1* | 8/2008 | Zaitsu et al. ............... 455/575.3 |
| 2009/0036181 A1* | 2/2009 | Lee ........................... 455/575.4 |
| 2010/0192356 A1* | 8/2010 | Zadesky et al. ............. 29/592.1 |

FOREIGN PATENT DOCUMENTS

| JP | 07-202469   | 8/1995  |
| JP | 2000-209314 | 7/2000  |
| JP | 2001-119773 | 4/2001  |
| JP | 2001-318735 | 11/2001 |
| JP | 2005-123502 | 5/2005  |
| WO | 2005/117047 | 12/2005 |

* cited by examiner

*Primary Examiner* — Hung V Duong
(74) *Attorney, Agent, or Firm* — Procopio, Cory, Hargreaves & Savitch LLP

(57) ABSTRACT

Provided is a portable electronic device having improved degree of freedom in designing. A cellular phone 1 has a display part 9, a frame 44 holding the display part 9, and a case 7 having a peripheral wall portion 31b which forms an open portion 31c. The frame 44 can be mounted in the case 7 from the open portion 31c, is screwed to the peripheral wall portion 31b by a screw 79 inserted in a direction intersecting the mounting direction, and fixed to the case 7, with the display part 9 exposed at the open portion 31c.

17 Claims, 11 Drawing Sheets

(a)

(b)

PORTABLE ELECTRONIC DEVICE

FIELD OF THE INVENTION

The present invention relates to a mobile phone, PDA (Personal Digital Assistant), digital camera, or other portable electronic device.

BACKGROUND

In a mobile phone or other portable electronic device, a substrate is sandwiched between a front case and a rear case, and the cases are fastened to each other by screws inserted in the stacking direction (see for example, Patent Document 1). Further, in such housing structures, ones having frames for placement of the substrate and a display unit are known as well (Patent Document 2).

Patent Document 1: Japanese Patent Publication (A) No. 2000-209314

Patent Document 2: Japanese Patent Publication (B) No. 7-202469

SUMMARY

In the housing structure explained above, however, due to the space for arrangement of the screws inserted in a direction from the front case to the rear case and screw bosses in which the screws are screwed, an area of a user interface exposed from the front case or rear case cannot help becoming smaller. Namely, a restriction arises in design in terms of the area of the user interface.

Accordingly, preferably a portable electronic device capable of improving the degree of freedom of design is provided.

A portable electronic device of a first aspect of the present invention includes a user interface, a frame holding the user interface, and a case having a peripheral wall portion forming an open portion, wherein the frame can be mounted in the case from the open portion, the frame is joined to the peripheral wall portion in a direction intersecting the mounting direction to be fastened to the case, and the user interface is held by the frame in a state where it is exposed at the open portion side.

Preferably, the frame is screwed to the peripheral wall portion by a screw inserted in a direction intersecting the mounting direction.

Preferably, the user interface has a display unit having a display screen which is exposed from the open portion and arranged at the open portion side of the frame and a fastening member having a cover portion covering the circumferential edge of the display unit from the display screen side and a first fastening portion which extends between the frame and the peripheral wall portion from the cover portion and is fastened together by the screw.

Preferably, the fastening member is a frame member in which an opening is formed facing the display screen, and the surface of the frame member opposite to the surface facing the display unit is provided with a transparent plate which closes the opening and has a circumferential edge which is located on an outer circumferential side from the circumferential edge of the frame member.

Preferably, the user interface has an operation member which is arranged at a position where it is not superimposed with the display unit in the mounting direction at the open portion side of the frame, the operation member has a second fastening portion extending between the frame and the peripheral wall portion and fastened by the screw, and the fastening member and the operation member are partially superimposed in the mounting direction.

Preferably, the user interface has a switch part which is arranged at a position not superimposed with the display unit in the mounting direction at the open portion side of the frame and can generate a signal by depression and an operation member which has a holding surface covering the switch part and holding a key top exposed from the open portion in a state that the key top can rock in the depression direction of the switch part and second fastening portion extending between the frame and the peripheral wall portion from the holding surface and fastened together by the screw, the fastening member and the operation member being partially superimposed in the mounting direction.

Preferably, the frame has conductivity and is electrically connected to a ground line of the substrate, and the fastening member has conductivity and is electrically connected to the ground line with the first fastening portion screwed together to the frame.

Preferably, the user interface has an operation member arranged at the open portion side of the frame, and the operation member has a second fastened portion extending between the frame and the peripheral wall portion and joined with the frame.

Preferably, the user interface has a switch part which is arranged at the open portion side of the frame and can generate a signal by depression and an operation member which has a holding surface covering the switch part and holding a key top exposed from the open portion in a state that the key can rock in the depression direction of the switch part and a second fastening portion extending between the frame and the peripheral wall portion from the holding surface and joined with the frame.

Preferably, the operation member has a conductive skeleton member having the second fastening member, the frame has conductivity and is electrically connected to the ground line of the substrate, and the skeleton member is electrically connected to the ground line by coupling of the second fastening member with the frame.

Preferably, the device includes an electric acoustic conversion part which is arranged in the case behind the user interface and performs conversion between sound and electric signals, wherein, at the outer circumferential side of the user interface, a clearance between at least one of the user interface and another member adjacent to the user interface and the peripheral wall portion forms a sound path linking the electric acoustic conversion part and the outside at the open portion side of the case.

Preferably, the frame has a recessed portion in which the user interface is placed at the open portion side, the electric acoustic conversion part is placed at the inner side of the case from the frame in a state where the frame is placed in the case, a groove portion extending to the open portion side from the inner side of the case and forming the clearance is formed in the surface at the outer circumferential side of the recessed portion of the frame, and the groove portion forms at least a portion of the sound path by adjoining the peripheral wall portion.

Preferably, the user interface has a display unit which has a display screen exposed from the open portion and is placed in the recessed portion and a fastening member having a cover portion covering the circumferential edge of the display unit from the display screen side so as to open up a region facing the groove portion and a first fastening portion extending between the frame and the peripheral wall portion from the cover portion and coupled with the frame.

Preferably, the device has a mesh member which is fastened to the frame and closes the groove portion.

Preferably, the fastening member is a frame member in which an opening facing the display screen is formed, and the surface of the frame member opposite to the surface facing the display unit is provided with a transparent plate which closes the opening, has a circumferential edge located at the outer circumferential side from the circumferential edge of the frame member, and has a cutaway portion in a region facing the groove portion.

Preferably, a groove portion extending to the open portion side from the inner side of the case and forming the clearance is formed in an inner surface of the peripheral wall portion.

A portable electronic device of a second aspect of the present invention is provided with a user interface, a frame for holding the user interface, and a case having a peripheral wall portion which forms an open portion, wherein the frame can be inserted into the case from the open portion and is fastened by being fit in the case in a state where the user interface is exposed at the open portion.

According to the present invention, the degree of freedom in design can be improved.

DETAILED DESCRIPTION

Below, an explanation will be given of an embodiment of a mobile phone 1 as an example of a portable electronic device of the present invention.

Figure 1:
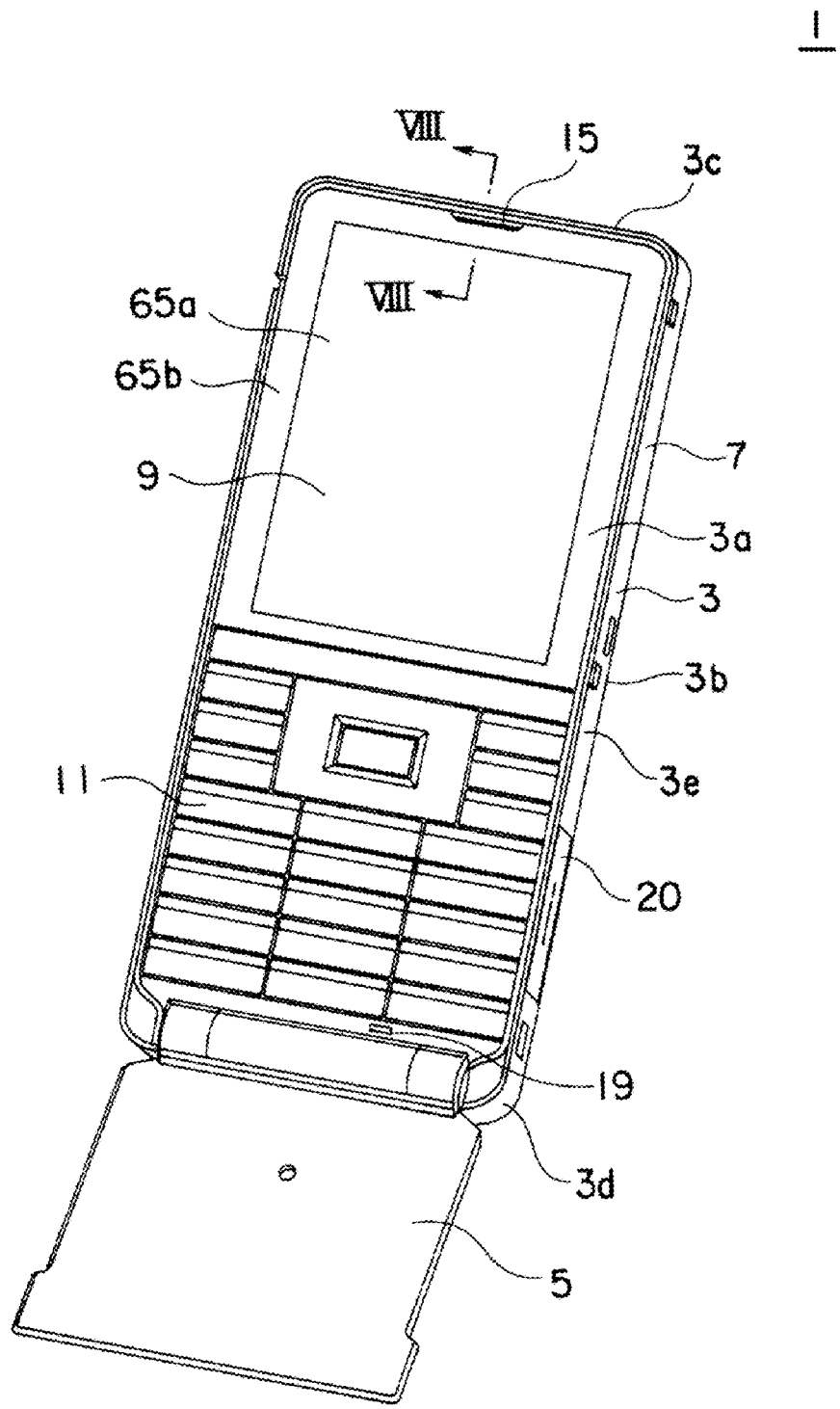
[FIG. 1] A perspective view showing an outer appearance of a mobile phone of an embodiment of the present invention.

FIG. 1 is a perspective view showing an outer appearance of a mobile phone 1 (portable electronic device) according to an embodiment of the present invention.

The mobile phone 1 is a so-called flip type mobile phone constituted by including a body part 3 and a flip part 5 which is coupled with the body part 3 so that folding is possible.

The body part 3 has a case 7 and display part 9 (user interface) and operation part 11 (user interface) which are held in the case 7 (note that the combination of the display part 9 and operation part 11 is also an example of the user interface). The display part 9 and the operation part 11 constitute a front surface 3a of the body part 3. The display part 9 is arranged on a first end 3c side of the body part 3, while the operation part 11 is arranged on a second end 3d side of the body part 3. In the front surface 3a of the body part 3, a sound emitting port 15 of a speaker 13 for speech (see FIG. 3, electric acoustic conversion part) and a sound pickup port 19 of a microphone 17 for speech (see FIG. 4, electric acoustic conversion part) are formed. The sound emitting port 15 is arranged closer to the first end 3c side from the display part 9, while the sound pickup port 19 is arranged closer to the second end 3d side from the operation part 11. In a side surface 3e of the body part 3, an insertion slot 20 of a not shown memory medium and an insertion hole of a connector (not shown) are provided.

Figure 2:
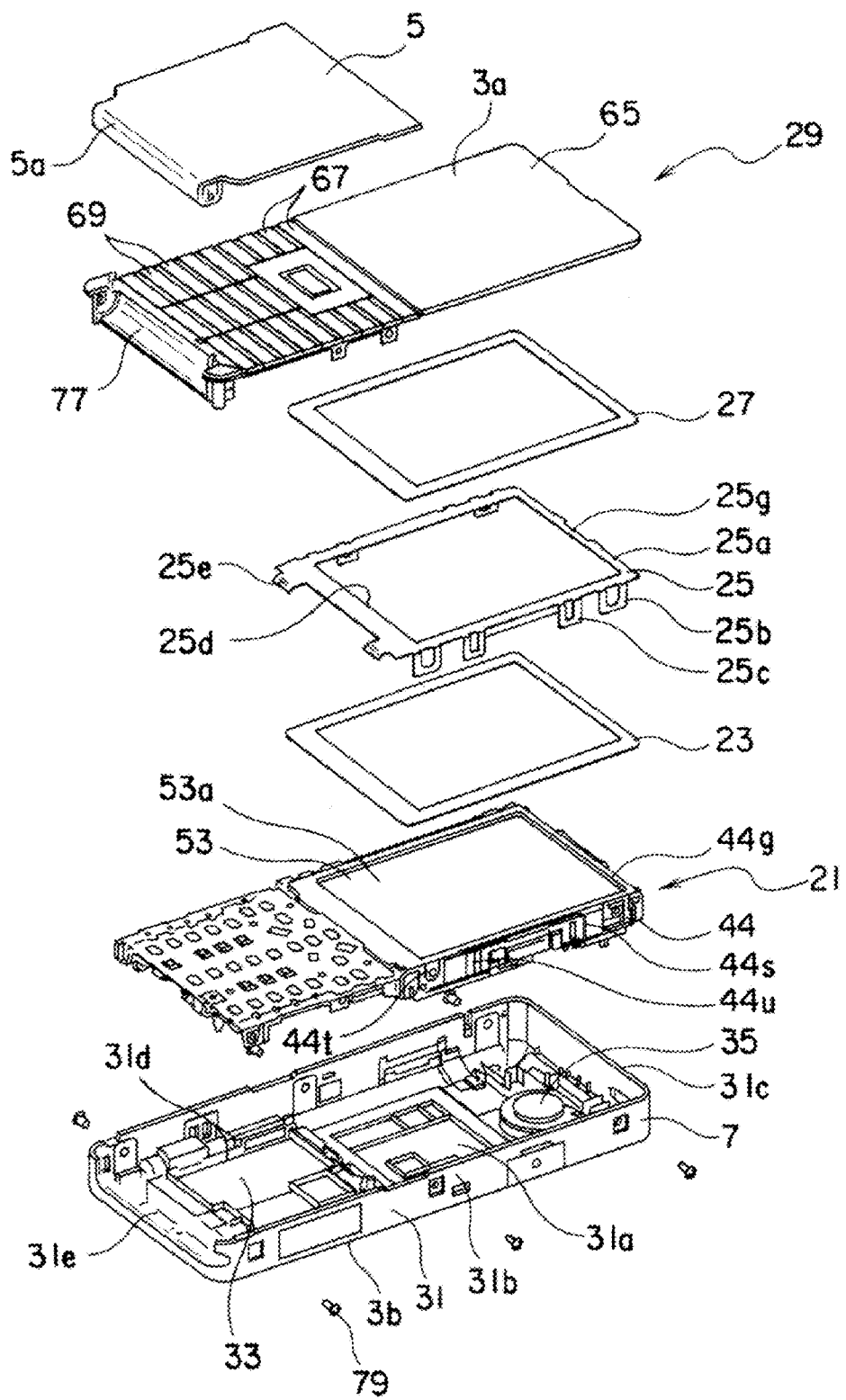
[FIG. 2] A broken down perspective view of the mobile phone of FIG. 1.

FIG. 2 is a broken down perspective view of the mobile phone 1.

The body part 3 of the mobile phone 1 is constituted by stacking, from a back surface 3b side of the body part 3 (bottom side of the sheet surface of FIG. 2), a case 7, an internal assembly 21 having various electric circuits etc., a packing 23, a frame member (fastening member) 25 for fastening predetermined members, two-sided tape 27, and a front surface member group 29 constituting the front surface 3a of the body part 3.

The case 7 has a rear case 31 and a lid 33 covering the back surface side of the rear case 31. The rear case 31 and the lid 33 are formed by, for example, a resin. The rear case 31 has a base portion 31a and a peripheral wall portion 31b projected from the circumferential edge of the base portion 31a to the front surface 3a side. The peripheral wall portion 31b extends along the circumferential edge of the base portion 31a except the second end 3d side. In the rear case 31, the surface facing the base portion 31a is opened whereby an open portion 31c is formed. Namely, the rear case 31 has the peripheral wall portion 31b forming the open portion 31c.

In the base portion 31a of the rear case 31, an opening 31d for inserting a not shown battery is formed. The lid 33 covers the back surface of the rear case 31 so as to close the opening 31d and is fastened to the rear case 31 by tabs etc. Note that, the back surface 3b of the body part 3 is constituted by the base portion 31a of the rear case 31 and the lid 33.

Note that, a planar shape of the case 7 (shape seen from the front surface 3a or back surface 3b) may be any appropriate shape, but is for example square. On the first end 3c side of the rear case 31 (right side of the sheet surface of FIG. 2), a speaker 35 for emitting audio alerts is attached so that the sound emitting surface is located at the base portion 31a side. In the base portion 31a of the rear case 31, a sound emitting port 37 (see FIG. 8) of the speaker 35 is formed. At the second end 3d side of the rear case 31 (left side of the sheet surface of FIG. 2), a recessed portion 31e to which an internal antenna 89 (see FIG. 10) etc. for wireless communication utilizing radio waves is attached is formed.

Figure 3:
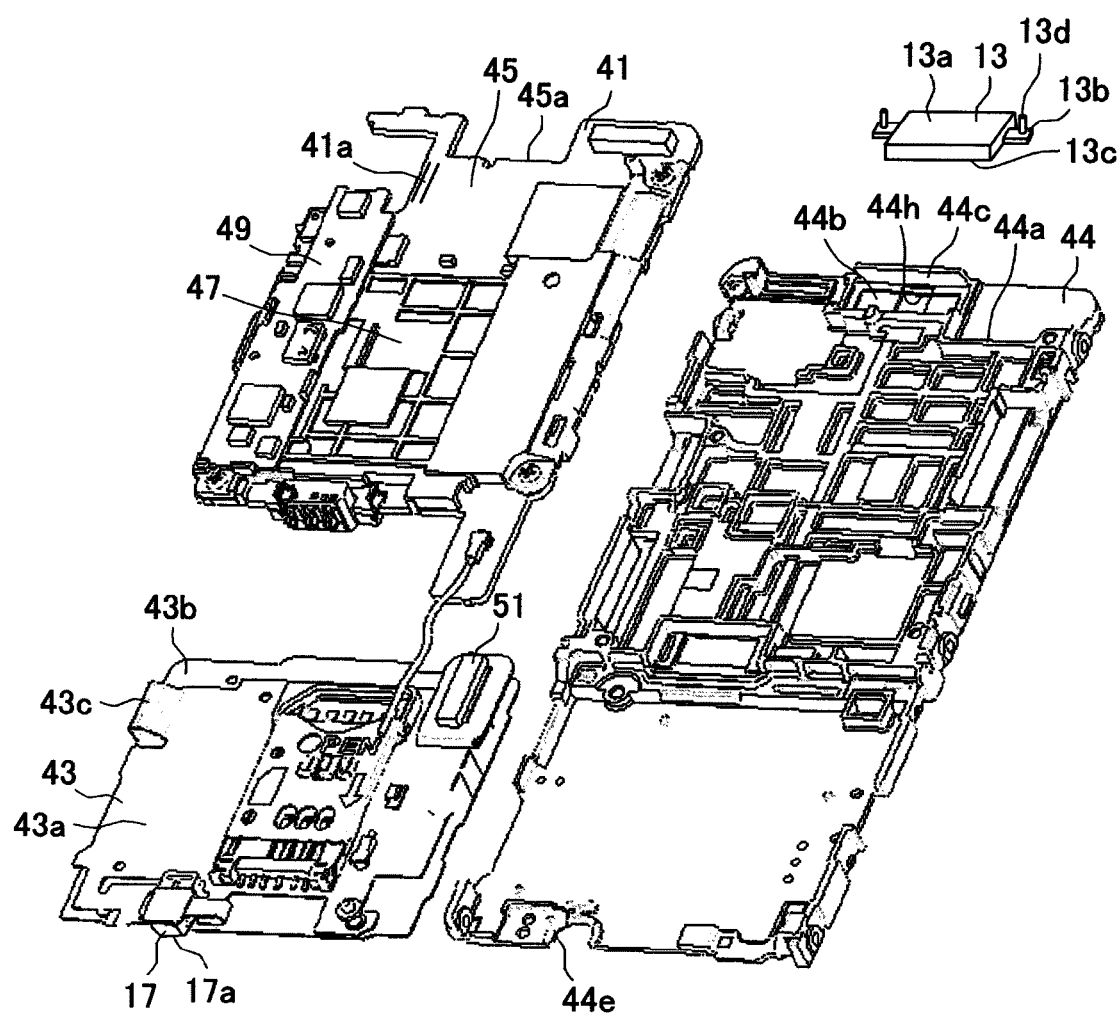
[FIG. 3] A broken down perspective view of a portion of an internal assembly of the mobile phone of FIG. 1.

FIG. 3 is a broken down perspective view showing a portion of the internal assembly 21. Note that, FIG. 3 is a view of the internal assembly 21 seen from the back surface 3b side of the body part 3 of the mobile phone 1.

The internal assembly 21 has a substrate assembly 41 arranged at the first end 3c side of the body part 3, an FPC (flexible printed circuit board) 43 arranged on the second end 3d side of the body part 3, and a frame 44 which is arranged stacked on the substrate assembly 41 and the FPC 43.

The substrate assembly 41 is configured by stacking, for example, a first circuit board 45, shield member 47, and second circuit board 49. The first circuit board 45 and the second circuit board 49 are configured by, for example, printed circuit boards using a resin as a base. The mounting surfaces of the first circuit board 45 and second circuit board 49 have various electronic parts mounted on them. On the substrate assembly 41, various electric circuits are configured. Further, the mounting surfaces of the first circuit board 45 and the second circuit board 49 have a ground pattern layer 41a (only a portion is shown) constituting a ground line formed on them. Note that the substrate assembly 41 may be configured by one circuit board as well.

The FPC 43 has a first mounting part 43a, a second mounting part 43b, and a connecting part 43c electrically connecting the first mounting part 43a and second mounting part 43b. The first mounting part 43a is provided with, for example, a microphone 17 and a connector 51 electrically connecting the FPC 43 and the first circuit board 45. Parts mounted on the second mounting part 43b will be explained later.

The frame 44, for example, is formed into a plate shape overall. At the first end 3c side of the body part 3 of the frame 44 (upper side of sheet surface of FIG. 3), the rear case 31, substrate assembly 41, and frame 44 are stacked in that order. On the second end 3d side of the frame 44 (lower side of the sheet surface of FIG. 3), the rear case 31, first mounting part 43a, frame 44, and second mounting part 43b are stacked in that order. Note that, the first mounting part 43a and second mounting part 43b and the frame 44 are fastened by, for example, two-sided tape, a binder, or other adhesive member. The first mounting part 43a is arranged on the rear case 31 side (front surface side of the sheet surface of FIG. 3) of the frame 44, while the second mounting part 43b connected to the connecting part 43c is arranged so that it is turned to the front surface 3a side (back surface side of the sheet surface of FIG. 3) of the frame 44.

The frame 44 has conductivity on the surface or overall. For example, the frame 44 is constituted by a metal. The frame 44 is electrically connected to the ground line of the substrate assembly 41 and functions as a shield case shielding the substrate assembly 41 and the FPC 43. For example, the frame 44 has, on the surface on the substrate assembly 41 side, a rib 44a which is projected to the substrate assembly 41 side and extends in the same shape as that of the ground pattern layer 41a of the mount surface at the frame 44 side of the first circuit board 45. Further, by making of the rib 44a abut against the ground pattern layer 41a, the frame 44 is electrically connected with the ground line of the first circuit board 45.

On the first end 3c side of the body part 3, a speaker 13 for receiving speech is clamped between the first circuit board 45 and the frame 44. For example, the speaker 13 has a body part 13a having a sound emitting surface 13c and a terminal part 13b having a spring terminal 13d. The terminal part 13b projects from both ends of the body part 13a. The body part 13a is fit in a recessed portion 44b formed in the frame 44 with the sound emitting surface 13c facing the frame 44 side. When the first circuit board 45 is stacked on the frame 44, the body part 13a is fit in a cutaway portion 45a provided in the first circuit board 45, and the terminal part 13b is pressed by both side portions of the cutaway portion 45a. At this time, the terminal 13d and not shown terminals provided on the two side portions of the cutaway portion 45a abut against each other, whereby the first circuit board 45 and the speaker 13 are electrically connected. Note that, the recessed portion 44b is constituted by, for example, ribs including a rib 44a and a rib 44c facing the rib 44a. In the bottom portion of the recessed portion 44b, for protecting the speaker 13 and/or preventing sound leakage to the periphery of the speaker 13, sponge, rubber, or other elastic member 83 (see FIG. 8) may be provided as well.

The microphone 17 is provided on a tongue piece projecting to the second end 3d side of the body part 3 in the first mounting part 43a. The microphone 17 is fit in a cutaway portion 44e provided in an edge portion at the second end 3d side of the frame 44 by bending the tongue piece. The microphone 17 is arranged so that a sound pickup surface 17a faces the front surface 3a side of the body part 3.

Figure 4:
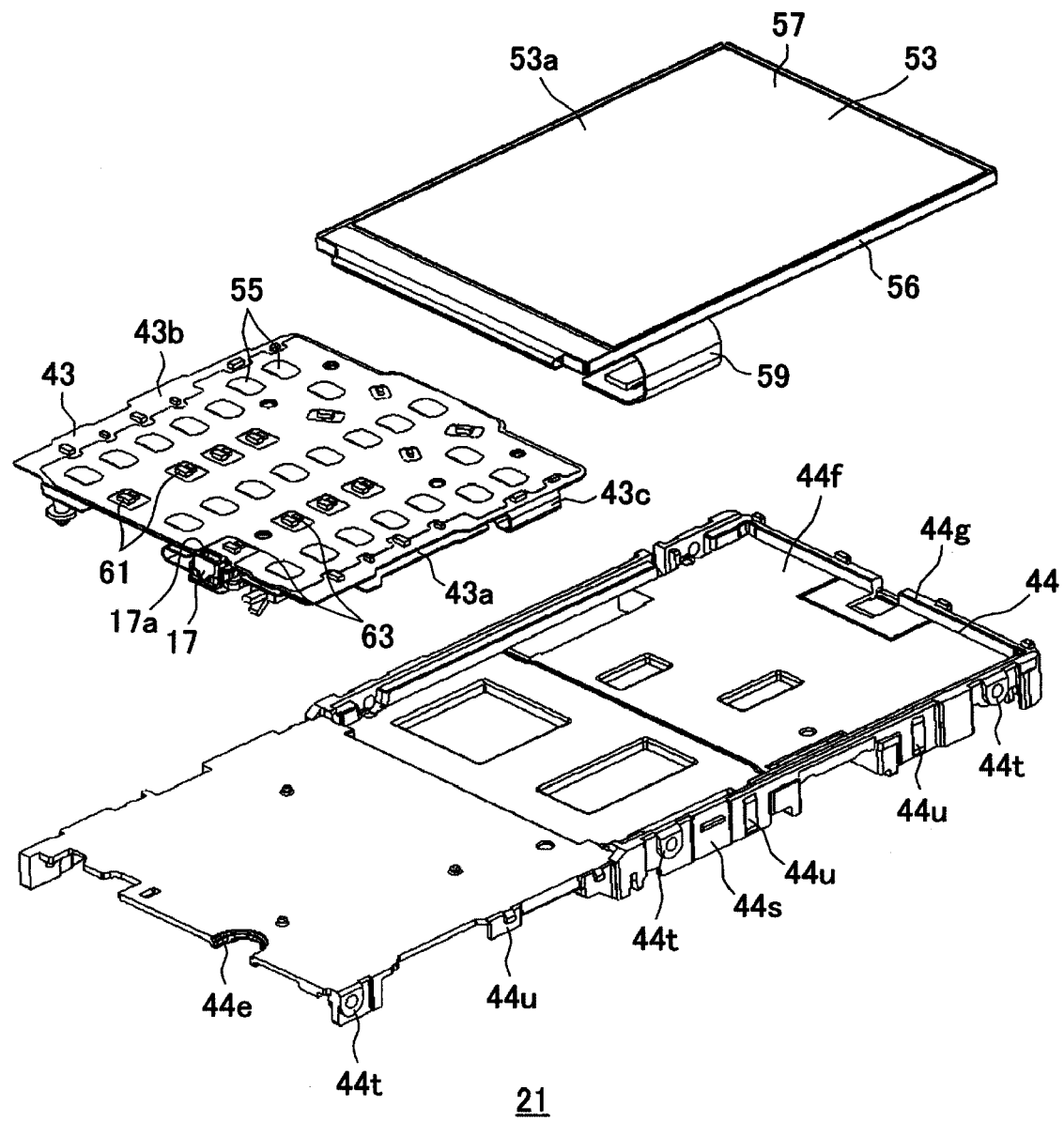
[FIG. 4] A broken down perspective view of a portion of the internal assembly seen from an opposite side of FIG. 3.

FIG. 4 is a broken down perspective view showing a portion of the internal assembly 21. Note that, FIG. 4 is a view seen from the front surface 3a side of the body part 3 of the mobile phone 1.

The internal assembly 21 has, in addition to the configuration explained with reference to FIG. 3, a display unit 53 and a plurality of switches 55.

The display unit 53 is configured by, for example, a liquid crystal display or organic EL display. The display unit 53 has, for example, a housing 56 and a transparent cover 57 forming an outer shape of the display unit 53. The housing 56 is formed by, for example, a metal. The transparent cover 57 is formed by, for example, a transparent resin. The outer shape formed by the housing 56 and transparent cover 57 is, for example, a rectangular plate shape. The transparent cover 57 is arranged over substantially the entire surface of the plate state. The region of arrangement of the transparent cover 57 has substantially the same or a slightly broader area than the display screen 53a of the display unit 53.

Note that, although not particularly shown, if the display unit 53 is a liquid crystal display, a liquid crystal, electrode, color filter, back light etc. are provided in the housing 56. If the display unit 53 is an organic EL display, a positive hole transport layer, electron transport layer, light emitting layer, electrodes, etc. are provided in the housing 56. The display unit 53 is electrically connected with the substrate assembly 41 arranged at the rear case 31 side of the frame 44 through the FPC 59 extending from the display unit 53.

On the surface on the front surface 3a side of the body part 3 of the frame 44, a recessed portion 44f in which the display unit 53 is fit is formed. In the first end 3c side of the frame 44, the recessed portion 44f is widened to close to the circumferential edge at the first end 3c side and side surface 3e side of the frame 44. The first end 3c side and side surface 3e side of the recessed portion 44f are constituted by an edge portion 44g of the frame 44. The display unit 53 is fit in the recessed portion 44f and fastened to the frame 44. Note that, the display unit 53 may be fastened with respect to the recessed portion 44f by two-sided tape, a binder, or other adhesive member or fastened to the recessed portion 44f by tabs.

A plurality of switches 55 are provided on the surface on the front surface 3a side of the body part 3 in the second mounting part 43b of the FPC 43. The plurality of switches 55 are constituted by dome switches or other depression type switches. When a switch 55 is depressed, a predetermined signal is generated and output through the FPC 43 to the substrate assembly 41.

Note that, in the second mounting part 43b, other than the plurality of switches 55, a plurality of LEDs 61 for illuminating the operation part 11 and a plurality of resistors 63 for adjusting current are provided between the plurality of switches 55.

The frame member 25 shown in FIG. 2 has conductivity. For example, the frame member 25 is formed from a single sheet metal. The frame member 25 has a cover portion 25a facing the display screen 53a of the display unit 53 and first fastening portions 25b and third fastening portions 25c which extend from the circumferential edge of the cover portion 25a to the back surface 3b side of the body part 3.

The cover portion 25a is formed with an opening 25d, whereby the cover portion 25a is formed into a frame shape. The shapes of the circumferential edge and opening 25d of the cover portion 25a may be appropriately set. However, these are, for example, rectangular. The circumferential edge and opening 25d of the cover portion 25a are set to sizes and shapes so that the circumferential edge of the display unit 53 can be covered by the cover portion 25a. For example, the circumferential edge of the cover portion 25a is larger than the housing 56 of the display unit 53, and the opening 25d is smaller than the transparent cover 57. Note that, a portion of the circumferential edge of the display unit 53 (for example, a portion on the second end 3d side) may have a portion which is not covered by the cover portion 25a as well. Further, the circumferential edge of the cover portion 25a is set to a size and shape so that the edge portion 44g on the first end 3c side and side surface 3e side of the frame 44 can be covered. Further, the circumferential edge of the cover portion 25a is set to a size and shape so that it can be inserted into the open portion 31c of the rear case 31.

On the second end 3d side of the cover portion 25a, a projecting portion 25e projecting to the second end 3d side is formed. In the projecting portion 25e, steps are formed so that the tip end is located on the back surface 3b side of the body part 3.

The first fastening portions 25b and the third fastening portions 25c are constituted so that they abut against a side surface 44s of the frame 44 and can grip the frame 44. In the first fastening portions 25b, engagement holes which can be engaged with screw bosses 44t (see FIG. 4 too) projecting from the side surface 44s of the frame 44 are formed. In the third fastening portions 25c, engagement holes which can be engaged with engaging portions 44u (see FIG. 4 too) projecting from the side surface 44s of the frame 44 are formed.

By the frame member 25 covering the display unit 53 and the frame 44 and by the first fastening portions 25b and third fastening portions 25c engaging with the screw bosses 44t and engaging portions 44u of the frame 44, the display unit 53 fit in the recessed portion 44f of the frame 44 is clamped between the frame member 25 and the frame 44 whereby detachment of the display unit 53 from the recessed portion 44f is prevented.

The packing 23 is constituted by, for example, a sponge, a rubber, or another elastic member. The packing 23 is formed to, for example, a size and shape so that it can abut against the surface on the display unit 53 side of the cover portion 25a of the frame member 25 over the entire circumference of the cover portion 25a. The packing 23 is sandwiched between the cover portion 25a of the frame member 25 and the display unit 53 and/or frame 44 and abuts against these members. The packing 23 is fastened to the frame member 25 by, for example, a binder, two-sided tape, or other adhesive member.

The front surface member group 29 has a transparent plate 65 for protecting the display unit 53, a cover member 67 concealing predetermined spaces and members, and operation members 69 for receiving an operation of a user. Note that, for explanation for easy understanding of the formation of the front surface 3a of the body part 3 by these members, these members were conceptually explained as the front surface member group 29. However, these members are not directly fastened to each other.

The transparent plate 65 is formed to a size and shape so that it fits at the first end 3c side in the open portion 31c of the rear case 31. The transparent plate 65 is fastened to the frame member 25 by two-sided tape 27. Note that, the two-sided tape 27 is set to a size and shape so that, for example, it can fasten the transparent plate 65 over the entire circumference of the frame member 25. Note that, the transparent plate 65 may be fastened to the frame member 25 by a binder or other adhesive member in place of the two-sided tape as well.

The transparent plate 65 is a member having a transparent region 65a (see FIG. 1) facing at least the display screen 53a of the display unit 53. For example, the transparent plate 65 is formed by a resin having a transparency. Further, on the outer circumferential side of the transparent plate 65, a shading region 65b (see FIG. 1) is formed so that the frame member 25 etc. can be concealed. The shading region 65b is formed by coating a paint or depositing a metal on the transparent resin. The shape of the transparent region 65a may be appropriately set, but, for example, is rectangular.

Figure 7:
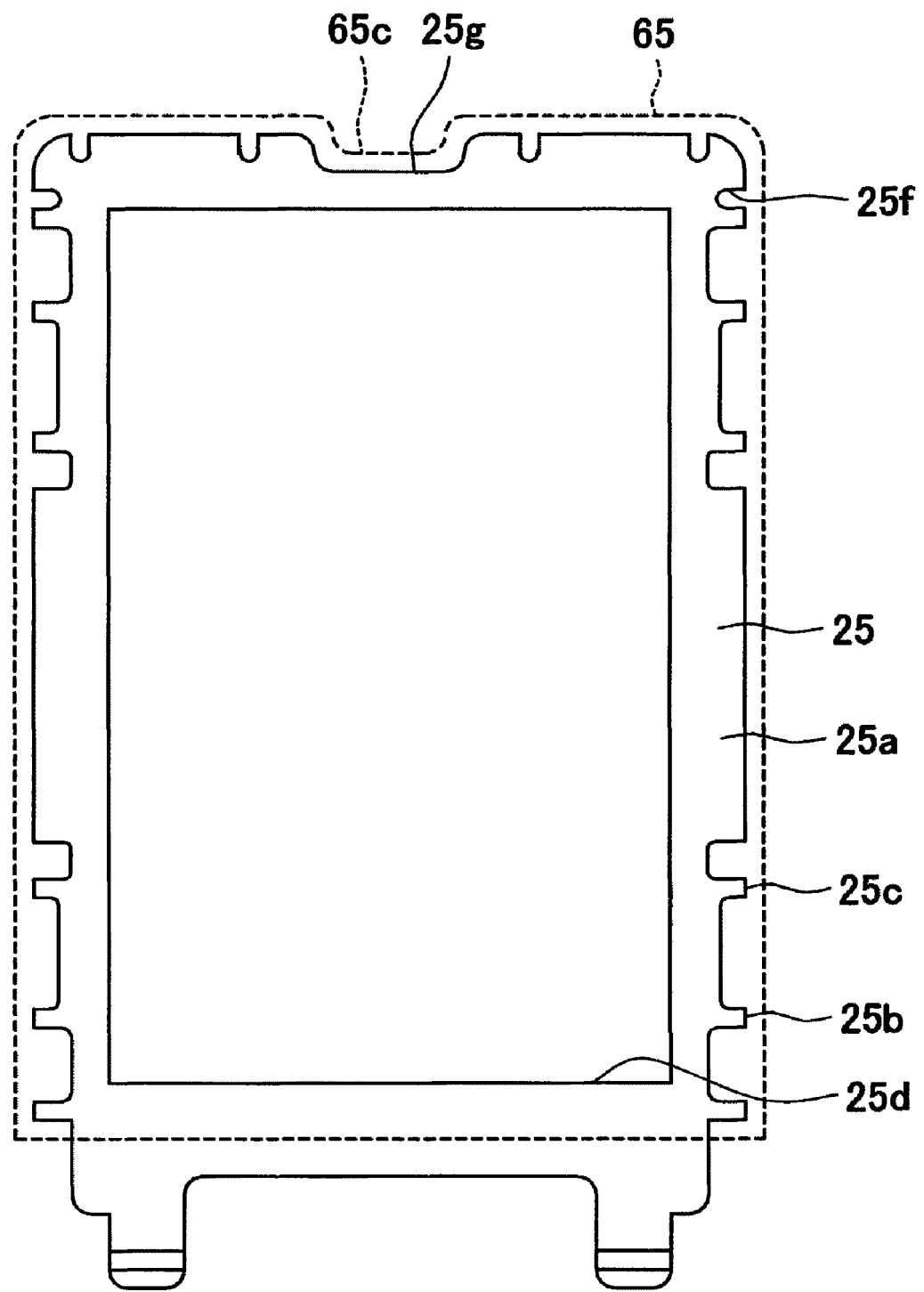
[FIG. 7] A plan view showing a frame member and a transparent plate of the mobile phone of FIG. 1.

FIG. 7 is a plan view showing the relationship of sizes of the transparent plate 65 and the frame member 25. The frame member 25 sometimes is unavoidably jagged at the outer edge of the cover portion 25a. For example, when forming the frame member 25 by press forming a single sheet metal, cutaway portions 25f are formed in order to prevent cracking at the time of bending. In such case, a clearance is formed between the frame member 25 and the peripheral wall portion 31b in the cutaway portions 25f. This is not preferred in view of waterproofing, dust-proofing, light leakage from the display unit 53, or design. Therefore, the transparent plate 65 is formed to a size and shape so that the outer edge of the cover portion 25a can be covered.

The cover member 67 is formed by, for example, a resin. The cover member 67 is arranged between the transparent plate 65 and the key tops 71 of the operation members 69 explained later. The method of fastening the cover member 67 will be explained later.

Figure 5:
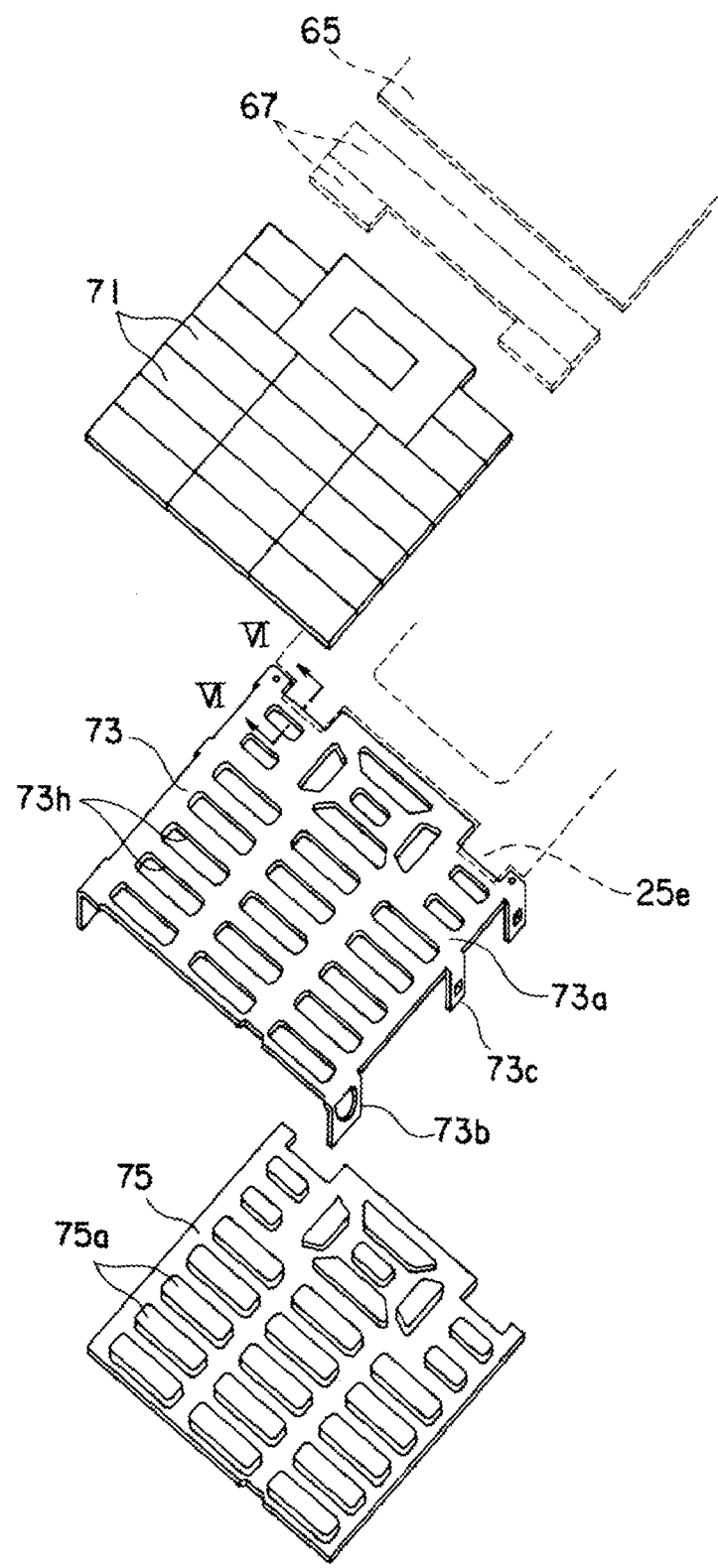
[FIG. 5] A broken down perspective view of an operation member of the mobile phone of FIG. 1.

FIG. 5 is a broken down perspective view of the operation members 69. Note that, the upper side of the sheet surface of FIG. 5 is the front surface 3a side of the body part 3.

The operation members 69 have a key sheet 75 covering a plurality of switches 55, a skeleton member 73 covering the key sheet 75, and a plurality of key tops 71 arranged on the skeleton member 73.

The key sheet 75 is formed by, for example, silicone rubber having a transparency. The key sheet 75 has for example a broadness wide enough to cover the second mounting part 43b of the FPC 43. On the key sheet 75, at the positions superimposed on the plurality of switches 55, a plurality of platform portions 75a projecting to the front surface 3a side are formed. Further, on the back surface sides of the platform portions 75a, at the positions facing the switches 55, pushers 75b (see FIG. 6) are projected.

The skeleton member 73 is formed from, for example, a single sheet metal. The skeleton member 73 has a cover portion 73a covering the key sheet 75 and second fastening portions 73b and fourth fastening portions 73c which project from the edge portion of the cover portion 73a to the key sheet 75 side. In the cover portion 73a, a plurality of hole portions 73h in which a plurality of platform portions 75a can be inserted are formed.

The second fastening portions 73b and the fourth fastening portions 73c are constituted so that these can abut against the side surface 44s of the frame 44 and grip the frame 44 in the same way as the first fastening portions 25b and third fastening portions 25c. In the second fastening portions 73b, in the same way as the first fastening portions 25b, engagement holes which can be engaged with the screw bosses 44t are formed. In the fourth fastening portions 73c, in the same way as the third fastening portions 25c, engagement holes which can be engaged with the engaging portions 44u are formed.

The key tops 71 are formed by, for example, a resin. The key tops 71 are formed larger than the hole portions 73h of the skeleton member 73. The key tops 71 are fastened to the platform portions 75a of the key sheet 75 through the hole portions 73h. Fastening the key tops 71 to the platform portions 75a is performed by an appropriate adhesive member such as a binder.

The key sheet 75 has elasticity, therefore, the platform portions 75a can rock in the depression direction of the switches 55 with respect to the skeleton member 73. Accordingly, the key tops 71 are held so that these can rock in the depression direction of the switches 55 by the surface (holding surface 69a, see FIG. 6) constituted by the skeleton member 73 and the key sheet 75 and covering the switches 55.

The plurality of key tops 71 are adjacent to each other when seen from the front surface 3a. Namely, at the front surface side of the key tops 71, no other member is arranged between key tops 71. Further, as shown in FIG. 1, when seen from the front surface 3a, the key tops 71 on the outer circumferential side and the peripheral wall portion 31b of the rear case 31 are adjacent to each other. Namely, on the front surface side of the key tops 71, no other member is arranged between the key tops 71 on the outer circumferential side and the peripheral wall portion 31b of the rear case 31.

As shown in FIG. 2, by coupling of the connection member 77 provided at the body part 3 with the connecting portion 5a provided at the flip part 5, the flip part 5 is coupled with the body part 3 so that it can be folded up. Note that, the connection member 77 and the connecting portion 5a form the front surface 3a of the body part 3 as well.

A method of assembling the mobile phone 1 having the above constitution will be explained next.

As explained with reference to FIG. 4, the display unit 53 is inserted into the recessed portion 44f of the frame 44. As explained with reference to FIG. 2, the frame member 25 is placed to cover the display unit 53 and frame 44 and fastened to the frame 44 by the first fastening portions 25b and third fastening portions 25c. As explained with reference to FIG. 2, the frame member 25 and the transparent plate 65 are fastened by two-sided tape 27. Note that, it is possible to fasten the frame member 25 to the frame 44 or fasten the frame member 25 and transparent plate 65 in advance.

As explained with reference to FIG. 3 and FIG. 4, the FPC 43 provided with the switches 55 is fastened to the frame 44 by two-sided tape etc. As explained with reference to FIG. 5, the operation members 69 are formed by stacking the key sheet 75, skeleton member 73, and key tops 71. Further, the operation members 69 are placed to cover the switches 55 on the frame 44 and fastened to the frame 44 by the second fastening portions 73b and fourth fastening portions 73c.

At this time, the frame member 25 and the operation members 69 are partially stacked on each other. Specifically, as shown in FIG. 5, at the tip end of the projecting portion 25e of the frame member 25, the edge portion on the first end 3c side of the skeleton member 73 is superimposed.

Figure 6:
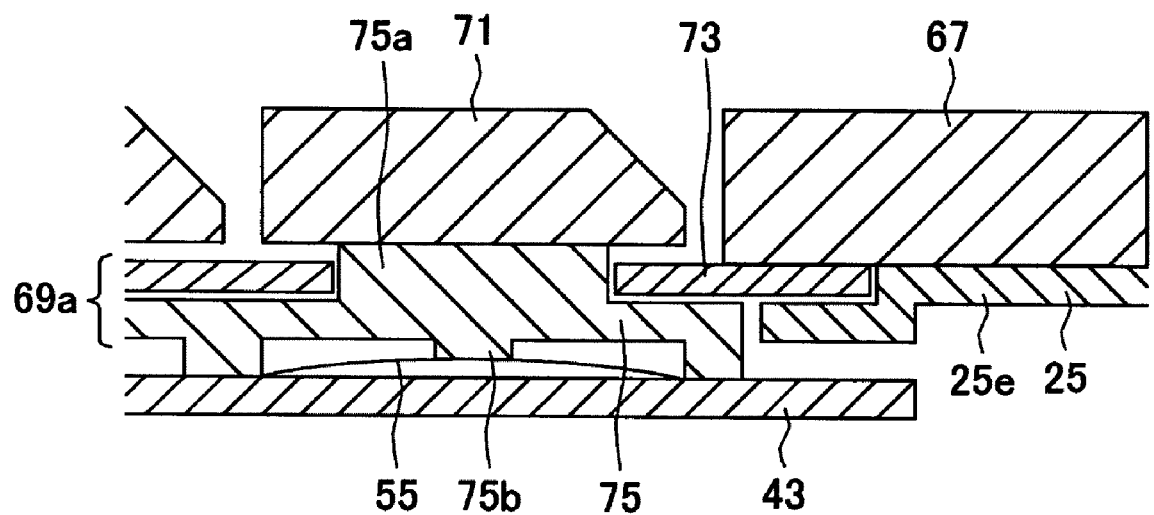
[FIG. 6] A sectional view of a line VI-VI of FIG. 5.

FIG. 6 is a sectional view taken along a VI-VI line of FIG. 5. As shown in this diagram as well, the edge portion of the skeleton member 73 is superimposed on the projecting portion 25e of the frame member 25. Note that, the projecting portion 25e has steps so that the portion superimposed on the skeleton member 73 is located closer to the back surface 3b side (lower side of the sheet surface) by the thickness of the skeleton member 73. The surface on the front surface 3a side of the majority of the frame member 25 and the surface on the front surface 3a side of the skeleton member 73 are on the same plane.

Note that, the device may be constituted so that the frame member 25 is superimposed on the front surface 3a side of the skeleton member 73 as well. The frame member 25 may be attached to the frame 44 or the skeleton member 73 may be attached to the frame 44 in advance. Note, attachment is easier when the members which are located at the back surface 3b side in the superimposed portion are attached earlier.

On a border line of the frame member 25 and the skeleton member 73, the cover member 67 is arranged. The cover member 67 is fastened to, for example, surfaces of the frame member 25 and skeleton member 73 on the front surface 3a side by two-sided tape, a binder, or other adhesive member. The border line between the frame member 25 and the skeleton member 73 is concealed by the cover member 67. Note that, the cover member 67 may be fastened after attachment of the frame 44 to the rear case 31 explained later.

As explained above, when the frame member 25 and the skeleton member 73 are attached to the frame 44, as shown in FIG. 1 and FIG. 2, these members are inserted in the rear case 31. At this time, the substrate assembly 41 is clamped between the frame 44 and the rear case 31. The side surface 44s of the frame 44 abuts against the inner circumference of the peripheral wall portion 31b of the rear case 31. Namely, the frame 44 is fit in the rear case 31. A state where the first fastening portions 25b and third fastening portions 25c of the frame member 25 and the second fastening portions 73b and fourth fastening portions 73c of the skeleton member 73 are inserted between the side surface 44s of the frame 44 and the inner circumferential surface of the peripheral wall portion 31b is exhibited.

Then, as shown in FIG. 2, a plurality of screws 79 are inserted through the peripheral wall portion 31b of the rear case 31. In other words, the plurality of screws 79 are inserted in a direction intersecting the mounting direction of the user interface such as the display part 9 and operation part 11 etc. in the case 7. The plurality of screws 79 are inserted through the first fastening portions 25b or second fastening portions 73b as well. Then, the plurality of screws 79 are screwed with the screw bosses 44t provided at the side surface 44s of the frame 44. The first fastening portions 25b and the second fastening portions 73b are fastened together with the frame 44 by the screws 79, abut against the frame 44, and are electrically connected with the ground line of the substrate assembly 41 through the frame 44. Note that, the screws 79 are formed out of, for example, metal.

Note that, the frame 44 is configured to be screwed with the peripheral wall portion 31b of the rear case 31 by the screws 79. However, the frame 44 may be configured other than by screwing so as to be fastened coupled with the peripheral wall portion 31b in a direction intersecting the mounting direction. In this case, the device is constituted so that the frame member 25 and skeleton member 73 are coupled with the frame 44 and fastened by engagement of the first fastening portions 25b and third fastening portions 25c with the engaged portions such as screw bosses 44t provided at the side surface 44s of the frame 44.

The connection member 77 is inserted in the rear case 31 on the second end 3d side. The connection member 77 and the inner circumferential surface of the peripheral wall portion 31b abut against each other. Namely, the connection member 77 is fit in the second end 3d side portion of the rear case 31. At this time, the connection member 77 is superimposed on the edge portion on the second end 3d side of the skeleton member 73 of the operation members 69. For the connection member 77, for example, not shown screws are inserted from the back surface 3b side of the rear case 31 and screwed with the connection member 77. The connection member 77 and flip part 5 may be connected or the connection member 77 and rear case 31 may be fastened in advance. Further, the connection member 77 may be fastened to the rear case 31 or the frame 44 may be fastened to the rear case 31 in advance. Note that, attachment is easier in the case where the frame 44 which becomes the back surface 3b side in the superimposed portion is fastened earlier.

Note that, the display part 9 is constituted by including the display unit 53, frame member 25, and transparent plate 65. Further, the operation part 11 is constituted by including the switches 55 and operation members 69.

The sound path of the speaker 13 will be explained next.

Figure 8:
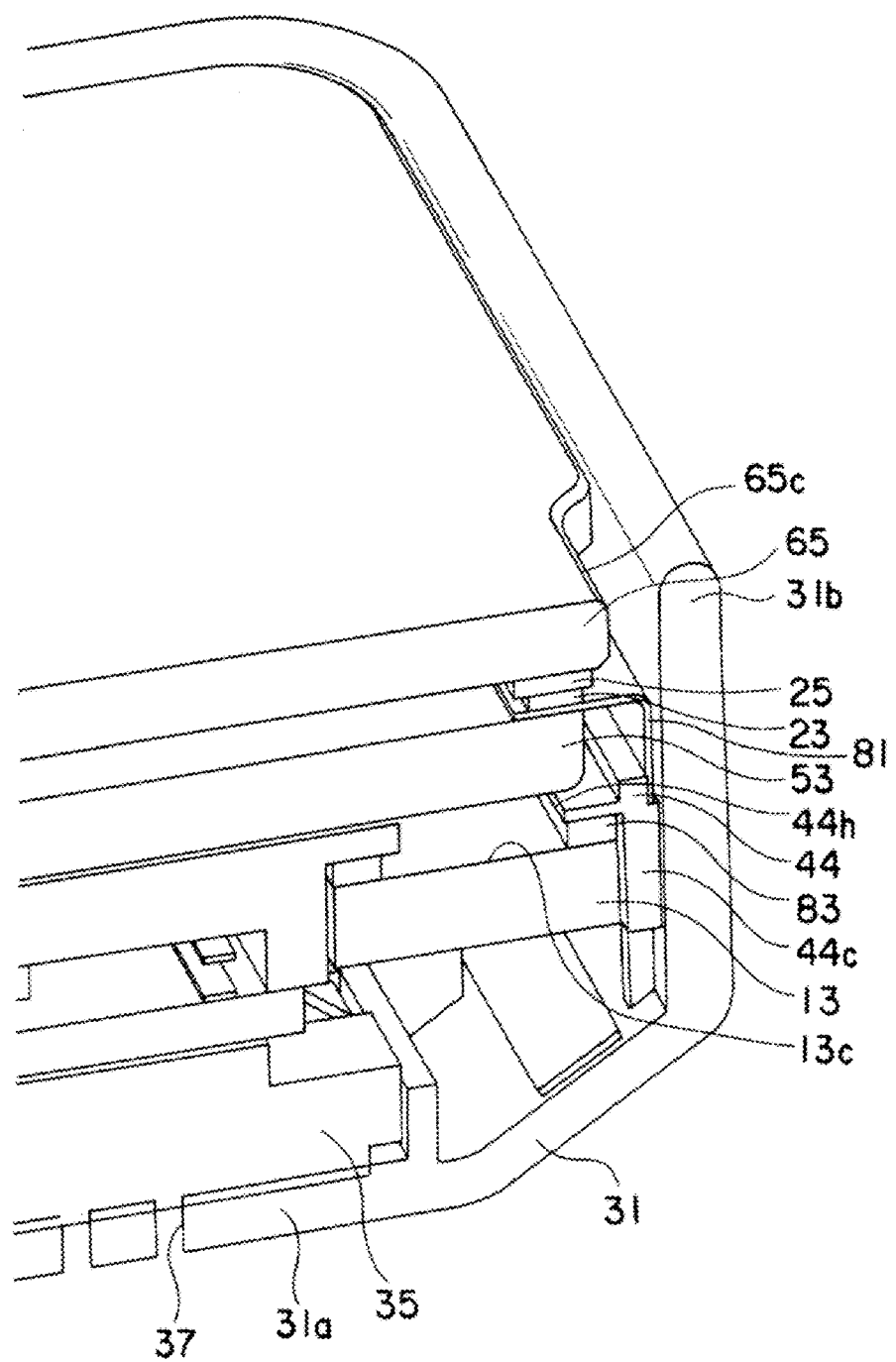
[FIG. 8] A sectional view of a line VIII-VIII of FIG. 1.
Figure 9:
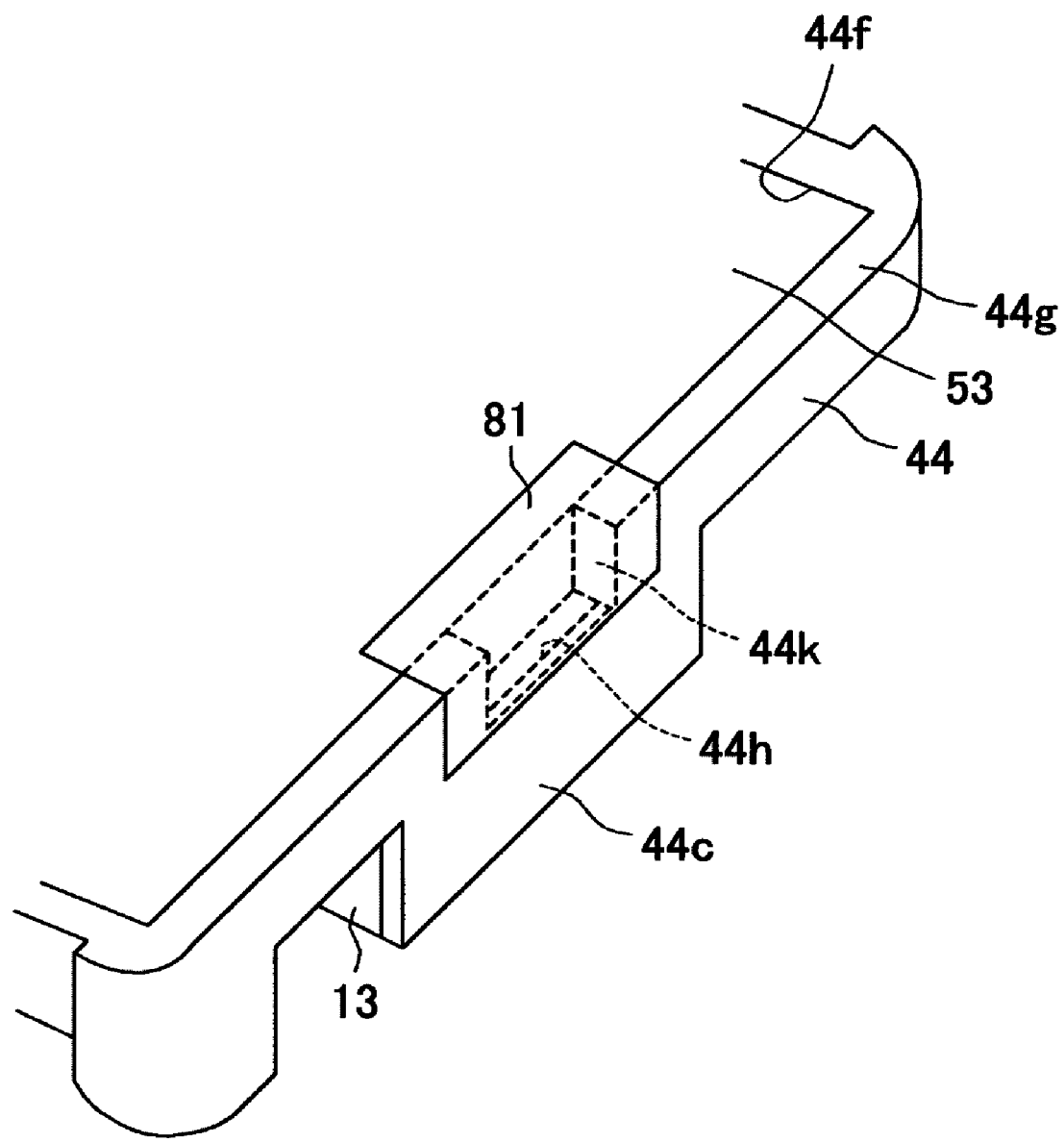
[FIG. 9] A perspective view showing portions of a display unit and the frame of the mobile phone of FIG. 1.

FIG. 8 is a sectional view taken along a VIII-VIII arrow direction of FIG. 1, while FIG. 9 is a perspective view showing the display unit 53 and frame 44 on the first end 3c side.

As shown in FIG. 3 and FIG. 8, the speaker 13 for receiving speech is arranged at the back surface 3b side of the frame 44 with the sound emitting surface 13c facing the frame 44. As shown in FIG. 3, FIG. 8, and FIG. 9, in the frame 44, a hole portion 44h is provided at the position facing the sound emitting surface 13c. The hole portion 44h penetrates through the frame 44 and links the space on the back surface 3b side of the frame 44 and the space on the front surface 3a side.

As shown in FIG. 9, in the outer circumferential surface on the first end 3c side of the frame 44, a groove portion 44k which extends from the inner side of the rear case 31 to the open portion 31c side (from the lower side of the sheet surface to the upper side of the sheet surface in FIG. 9) is formed. The groove portion 44k is formed in a tunnel shape (penetrates from the outer circumferential surface side of the frame 44 to the inside of the recessed portion 44f), while the outer circumferential surface of the display unit 53 is exposed to the outside of the frame 44. The end portion of the groove portion 44k on the inner side of the case is linked with the hole portion 44h. The end portion on the open portion 31c side of the groove portion 44k reaches the surface on the open portion 31c side of the frame 44.

As shown in FIG. 2 and FIG. 7, in the frame member 25, a recessed portion 25g is formed in the edge portion so as to open a position superimposed on the groove portion 44k in the projecting direction of the peripheral wall portion 31b of the rear case 31. Accordingly, a clearance linked with the groove portion 44k is formed between the frame member 25 and the inner circumference of the peripheral wall portion 31b of the rear case 31.

As shown in FIG. 7 and FIG. 8, in the transparent plate 65, a recessed portion 65c (cutaway portion) is formed in the edge portion so as to open the position superimposed on the recessed portion 25g in the projection direction of the peripheral wall portion 31b of the rear case 31. Accordingly, between the transparent plate 65 and the inner circumference of the peripheral wall portion 31b of the rear case 31, a clearance (sound emitting port 15 of FIG. 1) linked with the clearance formed by the recessed portion 25g is formed.

As explained above, the sound path of the speaker 13 is constituted by the hole portion 44h of the frame 44, the clearance between the display unit 53 and peripheral wall portion 31b which is formed by groove portion 44k, the clearance between the frame member 25 and peripheral wall portion 31b which is formed by the recessed portion 25g, and the clearance between the transparent plate 65 and peripheral wall portion 31b which is formed by the recessed portion 65c.

As shown in FIG. 8 and FIG. 9, the sound path of the speaker 13 is closed by the mesh member 81. The mesh member 81 is for preventing intrusion of moisture and dust from the outside through the sound path. The mesh member 81 is constituted by, for example, resin fiber. The mesh member 81 is fastened to the frame 44 and display unit 53. Fastening is performed by, for example, an adhesive member such as a binder. Note that, the mesh member 81 may be fastened to only the frame 44 as well. Further, the mesh member 81 may be fastened not between the display unit 53 and frame member 25 (packing 23), but between the transparent plate 65 and frame member 25.

Figure 10:
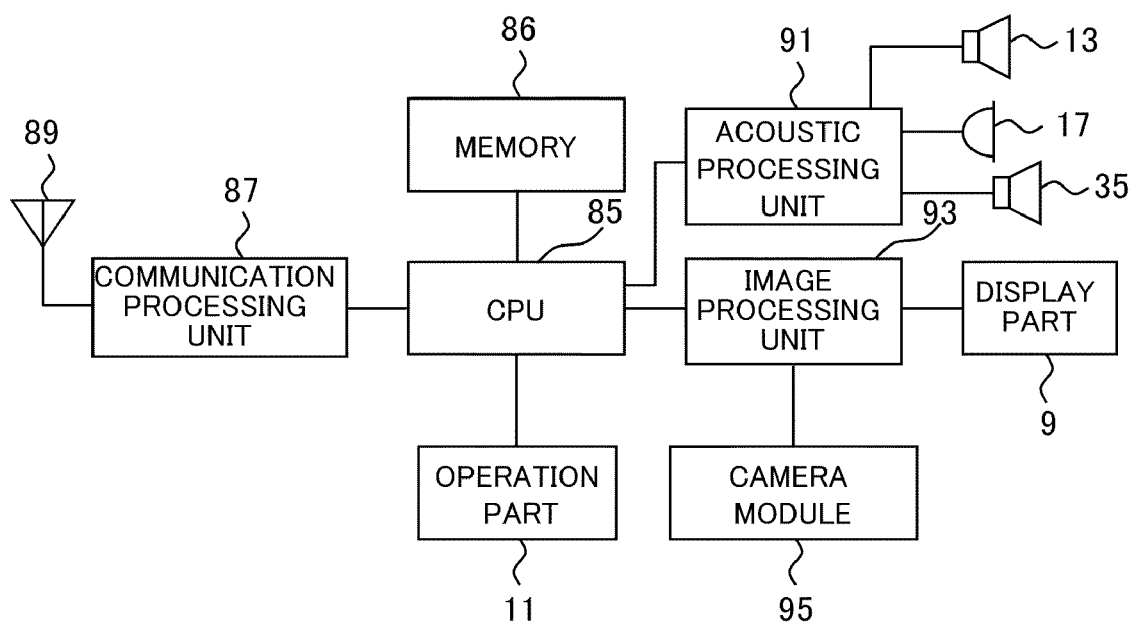
[FIG. 10] A block diagram showing the configuration of a signal processing system of the mobile phone of FIG. 1.

FIG. 10 is a block diagram showing the configuration of a signal processing system of the mobile phone 1.

The mobile phone 1 is provided with a CPU 85, memory 86, communication processing unit 87, acoustic processing unit 91, and image processing unit 93. These units are constituted by for example an IC provided in the substrate assembly 41.

The CPU 85 and the memory 86 functions as control units executing predetermined calculation based on signals from various types of means such as the operation part 11 and controlling various types of means such as the image processing unit 93.

The communication processing unit 87 is configured including a high frequency circuit. The communication processing unit 87 modulates various types of data processed at the CPU 85 such as acoustic data and image data and transmits the results through an antenna 89 for long distance wireless communication utilizing radio waves. Further, the communication processing unit 87 demodulates signals received via the antenna 89 and outputs the result to the CPU 85.

The acoustic processing unit 91 converts the acoustic data from the CPU 85 to an electric signal and outputs the result to the speaker 13 for speech and the speaker 35 for informing call reception etc. The speaker 13 and the speaker 35 convert electric signals from the acoustic processing unit 91 to sound and output the result. On the other hand, the microphone 17 converts the input sound to an electric signal and outputs the result to the acoustic processing unit 91. The acoustic processing unit 91 converts an electric signal from the microphone 17 to acoustic data and outputs the result to the CPU 85.

The image processing unit 93 converts image data from the CPU 85 to an image signal and outputs the result to the display part 9. Further, it converts an imaging signal (image data) output from a predetermined camera module 95 to image data having a predetermined format and outputs the result to the CPU 85.

According to the above embodiment, the mobile phone 1 is provided with the display part 9 and operation part 11 as user interfaces, the frame 44 holding the display part 9 and operation part 11, and the rear case 31 having the peripheral wall portion 31b which forms the open portion 31c. The frame 44 can be mounted in the rear case 31 from the open portion 31c, is screwed with the peripheral wall portion 31b by the screws 79 inserted in the direction intersecting the mounting direction, and is fastened to the rear case 31 in a state where the display part 9 and operation part 11 are exposed at the open portion 31c, therefore a front case is unnecessary. Since the front case is unnecessary, no mating line of the front case and the rear case is formed at the side surface 3e, so the design property is high. It is not necessary to form a superimposed portion of the front case and rear case either, therefore the outer shape of the case can be made small-sized as well. It is not necessary to provide regions for arranging the screws and screw bosses on the front surface 3a of the body part 3, therefore it is possible to arrange the display part 9, operation part 11, or other user interface up to the limit of the edge portion of the front surface 3a of the body part 3. The frame 44 and the peripheral wall portion 31b of the rear case 31 are adjacent to each other, therefore the lengths of the screws 79 only has to be larger than the thickness of the peripheral wall portion 31b. Accordingly, the lengths may be shorter than conventional screws which must penetrate through the case and its internal portion in the thickness direction. Due to this, the volume ratio required for the structure for fastening in the case 7 can be lowered. Accordingly, a smaller size of the entire apparatus is realized. In a device such as a mobile phone 1 in which the area of the side surface 3e is smaller than the area of the front surface 3a or back surface 3b, the design property becomes higher by providing the screw holes in the side surface. Since the screws 79 are inserted from the side surface 3e, it is not necessary to provide spaces for arranging screws and screw bosses at the substrate etc. as in the case of inserting screws in the stacking direction of the substrate etc. Accordingly, electronic parts can be mounted at positions superimposed with the screws 79 in the stacking direction. Namely, the degree of freedom in three-dimensional layout in the case is improved, so reduction of small becomes easier as well.

The mobile phone 1 has the display unit 53 which has the display screen 53*a* exposed from the open portion 31*c* and is arranged at the open portion 31*c* side of the frame 44 and the frame member 25 which has the cover portion 25*a* covering the circumferential edge of the display unit 53 from the display screen 53*a* side and first fastening portions 25*b* extending between the frame 44 and the peripheral wall portion 31*b* from the cover portion 25*a* and fastened by the screws 79, therefore the circumferential edge of the display unit is not exposed at the front surface 3*a* side. As a result, for example, entry of static electricity, moisture, and dust from the circumferential edge of the display unit 53 is prevented. Further, for example, the design property becomes higher. Further, the display unit 53 is kept from dropping off from the frame 44. The frame member 25 is fastened by the screws 79 for fastening the frame 44 to the rear case 31, therefore the frame member 25 is reliably kept from dropping off from the rear case 31 and frame 44 while preventing an increase in the number of parts (different screw etc.) due to fastening of the frame member 25 to the rear case 31 and frame 44. Accordingly, it is not necessary to provide space for providing other screws between the peripheral wall portion 31*b* and the frame 44 or the like. Accordingly, the projected area of the mobile phone 1 when seen from the front surface 3*a* can be made smaller relative to the area of the display unit 53.

The frame member 25 is a frame shaped member formed with the opening 25*d* facing the display screen 53*a*. The transparent plate 65 which closes the opening 25*d* and has a circumferential edge located on the outer circumferential side from the circumferential edge of the frame member 25 is provided on the surface of the frame member 25 opposite to the surface facing the display unit 53, therefore the display screen 53*a* is protected by the transparent plate 65, and the circumferential edge of the frame member 25 is covered as explained with reference to FIG. 7, so the design property is improved. Further, by fitting the transparent plate 65 with the peripheral wall portion 31*b*, entry of static electricity, moisture, and dust into the mobile phone 1 is further prevented, and the design property becomes high.

The mobile phone 1 has the switch 55 capable of generating a signal by depression and the operation members 69 having the holding surface 69*a* which cover the switch 55 and hold the key top 71 exposed from the open portion 31*c* so that the key top 71 can rock in the depression direction of the switch 55 and the second fastening portion 73*b* which extends between the frame 44 and the peripheral wall portion 31*b* from the holding surface 69*a* and is fastened by the screws 79, therefore it becomes possible to arrange the operation part 11 up to the limit of the edge portion of the front surface 3*a* of the body part 3, so the degree of freedom in design is improved.

Further, the switch 55 is arranged at the open portion 31*c* side of the frame 44 at position where the switch 55 is not superimposed with the display unit 53 in the mounting direction (stacking direction), and the frame member 25 and the operation members 69 are partially superimposed on each other in the mounting direction, therefore the open portion 31*c* can be buried by the user interface without forming any clearance between the display part 9 and the operation part 11. Further, the frame member 25 can be kept from dropping off by the operation members 69, and the display unit 53 etc. can be kept from dropping off by a small number of parts.

The frame 44 has conductivity and is electrically connected with the ground line of the first circuit board 45, while the frame member 25 has conductivity and is electrically connected with the ground line with the first fastening portions 25*b* fastened together with the frame 44, therefore entry of static electricity into the mobile phone 1 can be effectively prevented. Namely, the mobile phone 1 does not have a front case, therefore static electricity is liable to enter from the inner circumferential surface of the peripheral wall portion 31*b* of the rear case 31. However, due to the connection of the frame member 25 having the first fastening portions 25*b* inserted between the peripheral wall portion 31*b* and the frame 44 and the cover portion 25*a* adjacent to the peripheral wall portion 31*b* with the ground line, the frame member 25 is made to function as a lightning rod, so static electricity intruding along the inner circumferential surface of the peripheral wall portion 31*b* can escape to the frame member 25. Further, by fastening together the frame member 25 with the frame 44 by the screws 79, the frame member 25 is electrically connected with the ground line, therefore no new member is needed for electric connection. Further, when the frame member 25 is formed by a metal, the frame member 25 can be made small in size while obtaining a high strength.

In the same way, the operation members 69 have a conductive skeleton member 73 having the second fastening portions 73*b*, the frame 44 has conductivity and is electrically connected with the ground line of the first circuit board 45, and the skeleton member 73 is electrically connected with the ground line with the second fastening portions 73*b* fastened together the frame 44, therefore entry of static electricity into the mobile phone 1 can be effectively prevented.

The mobile phone 1 is provided with the rear case 31 having the peripheral wall portion 31*b* which forms the open portion 31*c*, the display unit 53 as the user interface which is arranged in the rear case 31 and is exposed from the open portion 31*c*, and the speaker 13 which is arranged in the rear case 31 behind the display unit 53 and converts between sound and electric signals. The sound path for linking the speaker 13 and the outside of the rear case 31 on the open portion 31*c* side is constituted by the clearance between the display unit 53 and the peripheral wall portion 31*b* on the outer circumferential side of the display unit 53, therefore the display unit 53 and the speaker 13 are not arranged in parallel, so a reduction in size of the front surface 3*a* of the body part 3 is achieved. In addition, even when the region between the display unit 53 and the peripheral wall portion 31*b* is very small, the sound path to the front surface 3*a* can be secured. Accordingly, it becomes possible to make the area of the front surface 3*a* small relative to the area of the display unit 53, and the degree of freedom in design is improved. For example, a novel design making the distance between the display unit 53 and the peripheral wall portion 31*b* 5 mm becomes possible.

The device is provided with the frame 44 mounted in the rear case 31 and having the recessed portion 44*f* in which the display unit 53 is arranged at the open portion 31*c* side, the speaker 13 is arranged at the opposite side to the open portion 31*c* side from the frame 44, and the surface on the outer circumferential side of the recessed portion 44*f* of the frame 44 is formed with the groove portion 44*k* which extends from the inner side of the rear case 31 to the open portion 31*c* side and forms a clearance which becomes the sound path, therefore the display unit 53 is reliably held by the recessed portion 44*f* of the frame 44, while a clearance acting as a sound path can be formed by a simple configuration.

The mobile phone 1 has the display unit 53 which has the display screen 53a exposed from the open portion 31c and is arranged in the recessed portion 44f and the frame member 25 which has the cover portion 25a covering the circumferential edge of the display unit 53 from the display screen 53a side and forming the recessed portion 25g at its edge portion so as to form a clearance linked with the groove portion 44k with the peripheral wall portion 31b and the first fastening portion 25b extending between the frame 44 and the peripheral wall portion 31b from the cover portion 25a and fastened together by the screws 79. Therefore, in addition to the effect of preventing the display unit 53 from dropping off as explained above, the effect that the sound path of the speaker 13 can be secured by a simple configuration in a narrow region is exhibited.

The mobile phone 1 has the mesh member 81 which is fastened to the frame 44 and closes the sound path, therefore entry of moisture or dust into the mobile phone 1 through the sound path is prevented. In a conventional device having a sound emitting port formed in a front case, a mesh member was adhered to the front case. In the present embodiment, by adhering the mesh member 81 to the frame 44, attachment of the mesh member 81 is realized even in a structure not having a front case. In the present embodiment, the sound path is formed by a clearance between the rear case 31 and the display unit 53 etc. Namely, a sound path is constituted first when the frame 44 etc. are inserted into the rear case 31. However, the mesh member 81 is adhered to the frame 44. Therefore, before insertion of the frame 44 etc. into the rear case 31, that is, before the formation of the sound path, attachment of the mesh member 81 is possible, so the degree of freedom in the assembly process is high.

The frame member 25 is a frame shaped member formed with the opening 25d facing the display screen 53a. On the surface of the frame member 25 opposite to the surface facing the display unit 53, a transparent plate which closes the opening 25d, has a circumferential edge located on the outer circumferential side from the circumferential edge of the frame member, and has a recessed portion facing the recessed portion 25g of the frame member 25 formed in its edge portion is provided. Therefore, in addition to the effect of covering the circumferential edge portion of the frame member 25 explained above, the effect that the sound path of the speaker 13 can be secured by a simple configuration in a narrow region is exhibited.

The present invention is not limited to the above embodiment and may be worked in various other ways.

The portable electronic device is not limited to a mobile phone. For example, the portable electronic device may be a digital camera or PDA as well. Further, the portable electronic device is not limited to a flip type device. For example, the portable electronic device may be a straight type device not having a flip part or a shell type device with two housings connected so that these can be opened and closed as well.

The case need only have a peripheral wall portion forming an open portion and does not have to have a base portion 31a of the embodiment. Namely, open portions may be formed in both of the front surface and the back surface of the case as well. In this case, user interfaces may be provided at both of the front surface and back surface. The outer shape of the case is not limited to a rectangle either, but may be an appropriate shape such as a circle.

Fastening if the frame and the case is not limited to fastening by screws intersecting the mounting direction of the frame. For example, it is also possible to provide tabs at the outer circumference of the frame and provide recessed portions engaging with the tabs of the frame in the inner circumferential surface of the peripheral wall portion or otherwise fasten the frame and the case by engagement. Further, the frame may be fastened to the case by just fitting the outer circumference of the frame in the inner circumferential surface of the peripheral wall portion. In the case of fastening by screws, the insertion direction of the screws is not limited to the orthogonal direction to the mounting direction (stacking direction) of the frame on the case. For example, the insertion direction of the screw may be a direction obliquely intersecting the mounting direction as well.

The fastening member covering the display unit and having the first fastening portions is not limited to a frame member. For example, in the embodiment, the example of fixing the transparent plate to the frame member was shown, but the frame member may be omitted, and the first fastening portions may be provided on the transparent plate as well. Namely, a member integrally forming the frame member and transparent plate may be used as the fastening member as well.

The operation member covering the switch part and having the second fastening portion is not limited to one constituted by key tops, a key sheet, and a skeleton member. For example, the skeleton member may be omitted and the second fastening member may be provided on the key sheet as well. The platform portion of the key sheet may be used as the key top as well.

The electric acoustic conversion part arranged behind the user interface is not limited to a speaker. It may be a microphone as well. The electric acoustic conversion part is not limited to one arranged on the opposite side to the open portion from than the frame. For example, the electric acoustic conversion part may be arranged between the user interface and the frame as well.

The sound path only has to be formed by the peripheral wall portion of the case and is not limited to one constituted by a clearance between the user interface and the peripheral wall portion. Namely, the sound path may be constituted on the outer circumferential side of the user interface by a clearance between the peripheral wall portion of the case and another member other than the user interface as well. Further, the clearance is not limited to one formed by providing a groove portion etc. in the frame, frame member, transparent plate etc.

Figure 11:
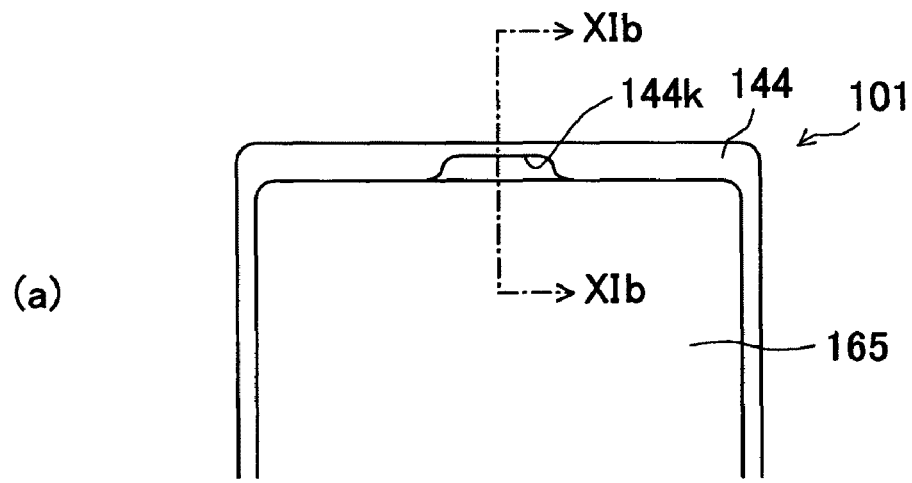
[FIG. 11] A diagram showing a modification.
Figure 11:
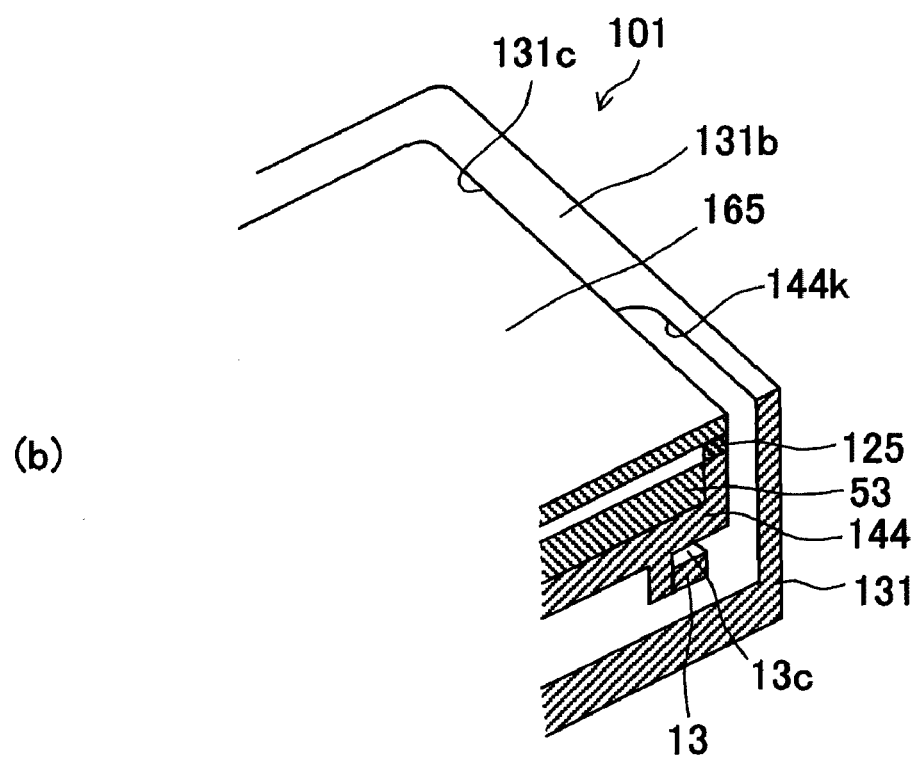

FIG. 11(a) is a plan view showing a modification of the mobile phone, and FIG. 11(b) is a sectional view of an XIb-XIb line of FIG. 11(a).

In a mobile phone 101, the groove portion and recessed portion of the edge portion are not formed in the frame 144, frame member 125, and transparent plate 165. Note, a groove portion 144k extending from the inner side of the case to an open portion 131c side is formed in the inner circumferential surface of a peripheral wall portion 131b of a rear case 131. One end of the groove portion 144k reaches the position of the sound emitting surface 13c of the speaker 13. The other end of the groove portion 144k reaches a top portion of the peripheral wall portion 131b. Accordingly, the sound path of the speaker 13 is constituted by a clearance between the frame 44, frame member 125, and transparent plate 165, and the peripheral wall portion 131b formed by the groove portion 144k.

I claim:
1. A portable electronic device comprising:
a user interface,
a frame holding the user interface, and
a case having a peripheral wall portion forming an open portion, wherein the frame can be mounted in the case from the open portion, the frame is joined to the peripheral wall portion in a direction intersecting the mounting direction to be fastened to the case, and the user interface is held by the frame in a state where it is exposed at the open portion side.

2. A portable electronic device as set forth in claim 1, wherein the frame is screwed to the peripheral wall portion by a screw inserted in a direction intersecting the mounting direction.

3. A portable electronic device as set forth in claim 2, wherein the user interface has:

a display unit having a display screen which is exposed from the open portion and arranged at the open portion side of the frame and a fastening member having a cover portion covering the circumferential edge of the display unit from the display screen side and a first fastening portion which extends between the frame and the peripheral wall portion from the cover portion and is fastened together by the screw.

4. A portable electronic device as set forth in claim 3, wherein:

the fastening member is a frame member in which an opening is formed facing the display screen, and the surface of the frame member opposite to the surface facing the display unit is provided with a transparent plate which closes the opening and has a circumferential edge which is located on an outer circumferential side from the circumferential edge of the frame member.

5. A portable electronic device as set forth in claim 3, wherein the user interface has an operation member which is arranged at a position where it is not superimposed with the display unit in the mounting direction at the open portion side of the frame, the operation member has a second fastening portion extending between the frame and the peripheral wall portion and fastened by the screw, and the fastening member and the operation member are partially superimposed in the mounting direction.

6. A portable electronic device as set forth in claim 3, wherein the user interface has:

a switch part which is arranged at a position not superimposed with the display unit in the mounting direction at the open portion side of the frame and can generate a signal by depression and an operation member which has a holding surface covering the switch part and holding a key top exposed from the open portion in a state that the key top can rock in the depression direction of the switch part and a second fastening portion extending between the frame and the peripheral wall portion from the holding surface and fastened by a screw, the fastening member and the operation member being partially superimposed in the mounting direction.

7. A portable electronic device as set forth in claim 3, wherein the frame has conductivity and is electrically connected to a ground line of a substrate, and the fastening member has conductivity and is electrically connected to the ground line with the first fastening portion screwed together to the frame.

8. A portable electronic device as set forth in claim 1, wherein the user interface has an operation member arranged at the open portion side of the frame, and the operation member has a second fastened portion extending between the frame and the peripheral wall portion and joined with the frame.

9. A portable electronic device as set forth in claim 1, wherein the user interface has a switch part which is arranged at the open portion side of the frame and can generate a signal by depression and an operation member which has a holding surface covering the switch part and holding a key top exposed from the open portion in a state that the key can rock in the depression direction of the switch part and a second fastening portion extending between the frame and the peripheral wall portion from the holding surface and joined with the frame.

10. A portable electronic device as set forth in claim 9, wherein the operation member has a conductive skeleton member having the second fastening member, the frame has conductivity and is electrically connected to the ground line of a substrate, and the skeleton member is electrically connected to the ground line by coupling of the second fastening member with the frame.

11. A portable electronic device as set forth in claim 1, comprising:

an electric acoustic conversion part which is arranged in the case behind the user interface and performs conversion between sound and electric signals, wherein at the outer circumferential side of the user interface, a clearance between at least one of the user interface and another member adjacent to the user interface and the peripheral wall portion forms a sound path linking the electric acoustic conversion part and the outside at the open portion side of the case.

12. A portable electronic device as set forth in claim 11, wherein the frame has a recessed portion in which the user interface is placed at the open portion side, the electric acoustic conversion part is placed at the inner side of the case from the frame in a state where the frame is placed in the case, a groove portion extending to the open portion side from the inner side of the case and forming the clearance is formed in the surface at the outer circumferential side of the recessed portion of the frame, and the groove portion forms at least a portion of the sound path by adjoining the peripheral wall portion.

13. A portable electronic device as set forth in claim 12, wherein the user interface has a display unit which has a display screen exposed from the open portion and is placed in the recessed portion and a fastening member having a cover portion covering the circumferential edge of the display unit from the display screen side so as to open up a region facing the groove portion and a first fastening portion extending between the frame and the peripheral wall portion from the cover portion and coupled with the frame.

14. A portable electronic device as set forth in claim 13, wherein the fastening member is a frame member in which an opening facing the display screen is formed, and the surface of the frame member opposite to the surface facing the display unit is provided with a transparent plate which closes the opening, has a circumferential edge located at the outer circumferential side from the circumferential edge of the frame member, and has a cutaway portion in a region facing the groove portion.

15. A portable electronic device as set forth in claim 12, wherein the device has a mesh member which is fastened to the frame and closes the groove portion.

16. A portable electronic device as set forth in claim 11, wherein a groove portion extending to the open portion side from the inner side of the case and forming the clearance is formed in an inner surface of the peripheral wall portion.

17. A portable electronic device provided with
a user interface,
a frame for holding the user interface, and
a case having a peripheral wall portion which forms an open portion, wherein
the frame can be inserted into the case from the open portion and is fastened by being fit in the case in a state where the user interface is exposed at the open portion.

\* \* \* \* \*